US012400306B2

United States Patent
Hanamoto et al.

(10) Patent No.: US 12,400,306 B2
(45) Date of Patent: Aug. 26, 2025

(54) OPERATION PROGRAM, OPERATION METHOD, AND OPERATION DEVICE FOR IMAGE PROCESSING

(71) Applicant: Maxell, Ltd., Kyoto (JP)

(72) Inventors: Atsushi Hanamoto, Tokyo (JP); Ryuji Imamura, Tokyo (JP)

(73) Assignee: Maxell, Ltd., Kyoto (JP)

( * ) Notice: Subject to any disclaimer, the term of this patent is extended or adjusted under 35 U.S.C. 154(b) by 693 days.

(21) Appl. No.: 17/479,878

(22) Filed: Sep. 20, 2021

(65) Prior Publication Data
US 2022/0092762 A1 Mar. 24, 2022

(30) Foreign Application Priority Data

Sep. 24, 2020 (JP) .................. 2020-159539
Jul. 15, 2021 (JP) .................. 2021-117335

(51) Int. Cl.
*G06T 7/00* (2017.01)
*G06N 3/04* (2023.01)

(52) U.S. Cl.
CPC ............. *G06T 7/0002* (2013.01); *G06N 3/04* (2013.01); *G06T 7/97* (2017.01); *G06T 2207/20084* (2013.01); *G06T 2207/30168* (2013.01)

(58) Field of Classification Search
CPC ........ G06T 7/0002–7/001; G06T 2207/30168; G06N 3/04–3/0499
See application file for complete search history.

(56) References Cited

U.S. PATENT DOCUMENTS

| | | | | |
|---|---|---|---|---|
| 4,863,268 | A | * | 9/1989 | Clarke ............... G01F 1/661 356/237.2 |
| 2016/0163035 | A1 | * | 6/2016 | Chang ............... G06N 3/084 382/149 |
| 2020/0018944 | A1 | * | 1/2020 | Fang ............... H01J 37/222 |

FOREIGN PATENT DOCUMENTS

JP A-2019-106111 6/2019

* cited by examiner

*Primary Examiner* — Wassim Mahrouka
(74) *Attorney, Agent, or Firm* — Dority & Manning, P.A.

(57) ABSTRACT

A detection method with high robustness that can determine a feature of an input image regardless of characteristics of a detected part in the image is provided. An operation program causes a computer to perform a feature quantity acquiring step of acquiring a feature quantity which is extracted from an input image, a reconstruction error calculating step of calculating a reconstruction error on the basis of a difference between the acquired feature quantity and an average which is determined in advance on the basis of a normal image, and an output step of outputting a result of calculation in the reconstruction error calculating step.

11 Claims, 14 Drawing Sheets

OPERATION PROGRAM, OPERATION METHOD, AND OPERATION DEVICE FOR IMAGE PROCESSING

BACKGROUND OF THE INVENTION

Field of the Invention

The invention relates to an operation program, an operation method, and an operation device.

Priority is claimed on Japanese Patent Application No. 2020-159539, filed Sep. 24, 2020, and No 2021-117335, filed Jul. 15, 2021, the content of which is incorporated herein by reference.

DESCRIPTION OF RELATED ART

In the related art, there is a technique of determining whether an input image is a normal image as an image processing technique. For example, an anomaly detection method using sparse coding is known as such a method of determining whether an input image is a normal image (for example, see Patent Document 1).

Patent Documents

[Patent Document 1] Japanese Unexamined Patent Application, First Publication No. 2019-106111

SUMMARY OF THE INVENTION

According to the aforementioned technique, an operation program which is constructed to detect an image with a low proportion of an anomaly part in the image may have difficulty detecting an image with a high proportion of an anomaly part image.

Therefore, an objective of the invention is to provide a detection method with high robustness that can determine a feature of an input image regardless of the characteristics of a detected part in the image.

According to an aspect of the invention, there is provided an operation program causing a computer to perform: a feature quantity acquiring step of acquiring a feature quantity which is extracted from an input image; a reconstruction error calculating step of calculating a reconstruction error on the basis of a difference between the acquired feature quantity and an average which is determined in advance on the basis of a normal image; and an output step of outputting a result of calculation in the reconstruction error calculating step.

The operation program according to the aspect of the invention may cause the computer to further perform a dictionary information acquiring step of acquiring a difference from the average which is determined in advance on the basis of a normal image as dictionary information including a plurality of elements of which each is a pattern of a plurality of features constituting the feature quantity extracted from the image, and the reconstruction error calculating step may include calculating the reconstruction error by reconstructing the acquired feature quantity on the basis of the acquired dictionary information.

In the operation program according to the aspect of the invention, the reconstruction error calculating step may include calculating the reconstruction error by performing an optimization operation of calculating an optimal value on the basis of a predetermined function.

In the operation program according to the aspect of the invention, the feature quantity acquiring step may include acquiring a plurality of feature quantities extracted from the input image, the reconstruction error calculating step may include calculating the reconstruction error for each of the plurality of acquired feature quantities and calculating the reconstruction error of the input image by performing an operation based on the calculated reconstruction errors, and the output step may include conclusively outputting the calculated reconstruction error of the input image.

In the operation program according to the aspect of the invention, the reconstruction error calculating step may include calculating the reconstruction error using a smaller number of feature quantities than the number of feature quantities acquired in the feature quantity acquiring step.

The operation program according to the aspect of the invention may cause the computer to further perform a determination step of determining whether the input image is a normal image on the basis of a predetermined threshold value and the reconstruction error calculated in the reconstruction error calculating step.

In the operation program according to the aspect of the invention, the feature quantity acquiring step may include acquiring the feature quantity from a plurality of intermediate layers of a convolutional neural network with the input image as an input.

In the operation program according to the aspect of the invention, the convolutional neural network may be additionally provided in the operation program.

According to another aspect of the invention, there is provided an operation method including: a feature quantity acquiring process of acquiring a feature quantity which is extracted from an input image; a reconstruction error calculating process of calculating a reconstruction error on the basis of a difference between the acquired feature quantity and an average which is determined in advance on the basis of a normal image; and an output process of outputting a result of calculation in the reconstruction error calculating process.

According to another aspect of the invention, there is provided an operation device including: a feature quantity acquiring unit configured to acquire a feature quantity which is extracted from an input image; a reconstruction error calculating unit configured to calculate a reconstruction error on the basis of a difference between the acquired feature quantity and an average which is determined in advance on the basis of a normal image; and an output unit configured to output a result of calculation from the reconstruction error calculating unit.

According to the invention, it is possible to provide a detection method with high robustness that can determine a feature of an input image regardless of characteristics of a detected part in the image.

DETAILED DESCRIPTION OF THE INVENTION

[Anomaly Detection According to Related Art]

Anomaly detection according to the related art will be described first with reference to the accompanying drawings.

Figure 13:
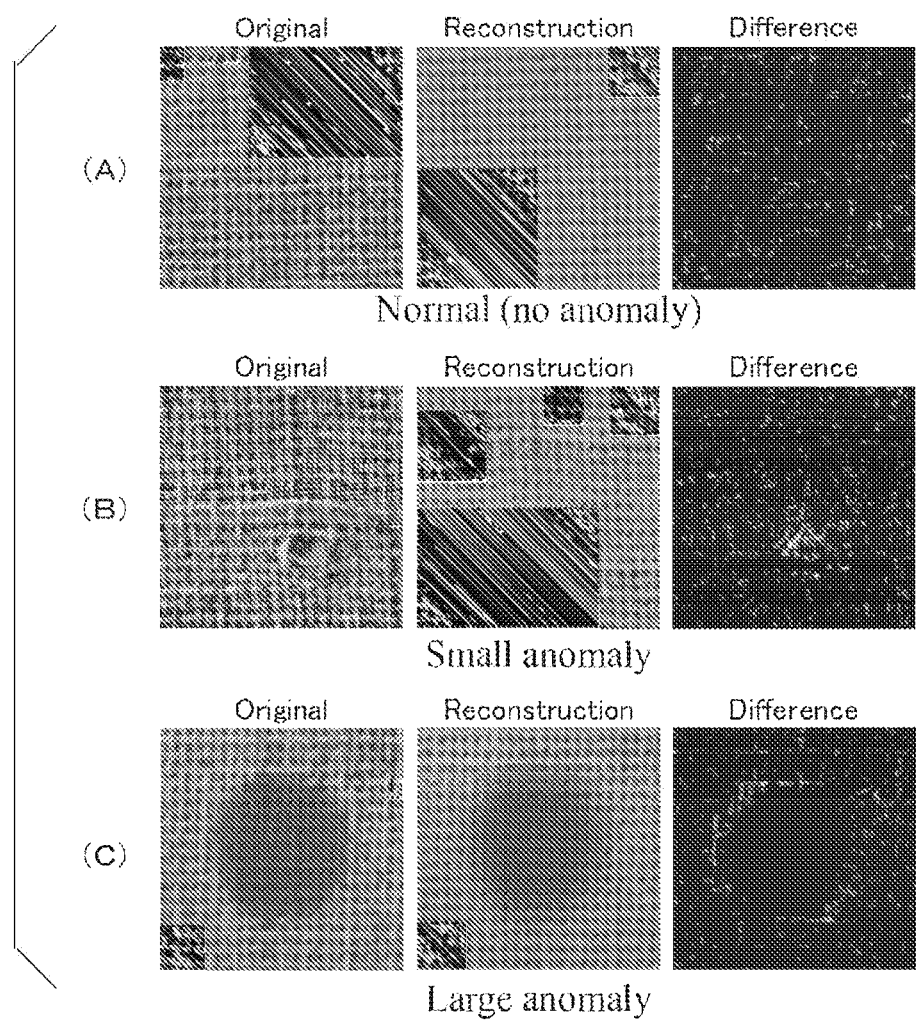
FIG. 13 is a diagram illustrating an example of a normal image and an anomaly image which are used to detect an anomaly according to the related art.

FIG. 13 is a diagram illustrating an example of a normal image and an anomaly image which are used to detect an anomaly according to the related art. In an anomaly detection technique according to the related art, an anomaly is detected from an input image using a predetermined method such as sparse coding. According to the related art, an input image is compressed using the predetermined method such as sparse coding and is then reconstructed, a difference image is created by comparing the original input image with the reconstructed image, and it is determined whether the input image is a normal image on the basis of the difference image.

FIG. 13(A) is a diagram illustrating an example of a normal image (Normal). In the drawing, an original input image (Original), a reconstructed image (Reconstruction), and an image indicating differences between the input image and the reconstructed image (Difference) are illustrated sequentially from the left. In the image indicating differences, a dark part represents a place with no difference and a bright part represents a place with a difference. As illustrated in the drawing, in the case of a normal image, differences hardly appear in the image indicating differences.

FIG. 13(B) is a diagram illustrating an example of an image with a small anomaly (Small Anomaly). In the drawing, similarly to FIG. 13(A), an original input image, a reconstructed image, and an image indicating differences between the input image and the reconstructed image are illustrated sequentially from the left. As illustrated in the drawing, in the case of an image with a small anomaly, an area with an anomaly in the image indicating differences is bright.

FIG. 13(C) is a diagram illustrating an example of an image with a large anomaly (Large Anomaly). In the drawing, similarly to FIG. 13(A), an original input image, a reconstructed image, and an image indicating differences between the input image and the reconstructed image are illustrated sequentially from the left. As illustrated in the drawing, in the case of an image with a large anomaly, an area with an anomaly in the image indicating differences remains dark.

That is, according to the related art, when a proportion of an anomaly part in the input image is large, the anomaly part may be erroneously detected as being normal.

Figure 14:
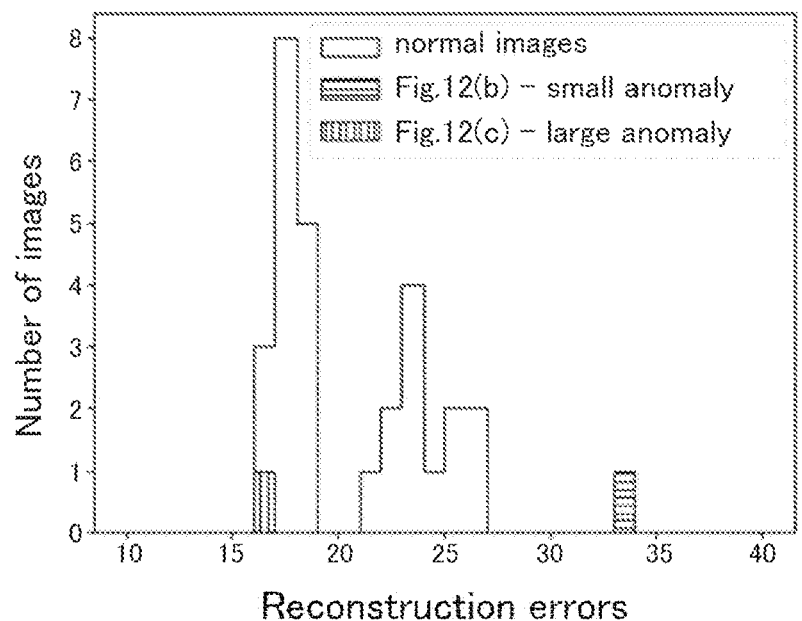
FIG. 14 is a diagram illustrating a problem in the related art.

FIG. 14 is a diagram illustrating a problem in the related art. The drawing is a diagram illustrating the number of reconstruction errors in a plurality of normal input images, an image with a small anomaly, and an image with a large anomaly. When a reconstruction error is large, it is an image with a large bright part in the image indicating differences illustrated in FIG. 13. When the number of reconstruction errors is large, the input image can be determined to be an image with an anomaly.

An example in which a reconstruction error which is a difference between an input image and a reconstructed image is used for a method of detecting a feature in an input image is described in this embodiment, but the invention is not limited thereto. The ratio between two images may be used to extract the difference between the two images or a pre-process such as predetermined modification or change in luminance level may be performed before the difference is extracted. The difference between two images may be detected on the basis of the position, the density, or the like in which the difference between two images is generated.

As illustrated in the drawing, in a normal image, the number of reconstruction errors ranges from 16 to 27. In an image with a small anomaly, the number of reconstruction errors is 34, which departs from the range of the number of reconstruction errors for a normal image. Accordingly, an anomaly can also be detected from an image with a small anomaly according to the related art.

On the other hand, in an image with a large anomaly, the number of reconstruction errors is 16, which is in the range of the number of reconstruction errors for a normal image. That is, according to the related art, there is a problem in that an image with a large anomaly is erroneously detected to be a normal image.

In order to solve this problem, the invention provides a detection method with high robustness that can determine whether an input image is a normal image regardless of a proportion of an anomaly part in the image.

FIGS. 13 and 14 are diagrams illustrating the related art. According to the invention, it is possible to determine a feature of an input image regardless of characteristics of a detected part in the image in addition to a proportion of an anomaly part in the image. That is, a predetermined feature in an input image can also be detected or extracted by appropriately adjusting a detection threshold value or the like in addition to detection of an anomaly part.

First Embodiment

Hereinafter, a first embodiment of the invention will be described with reference to the accompanying drawings.

Figure 1:
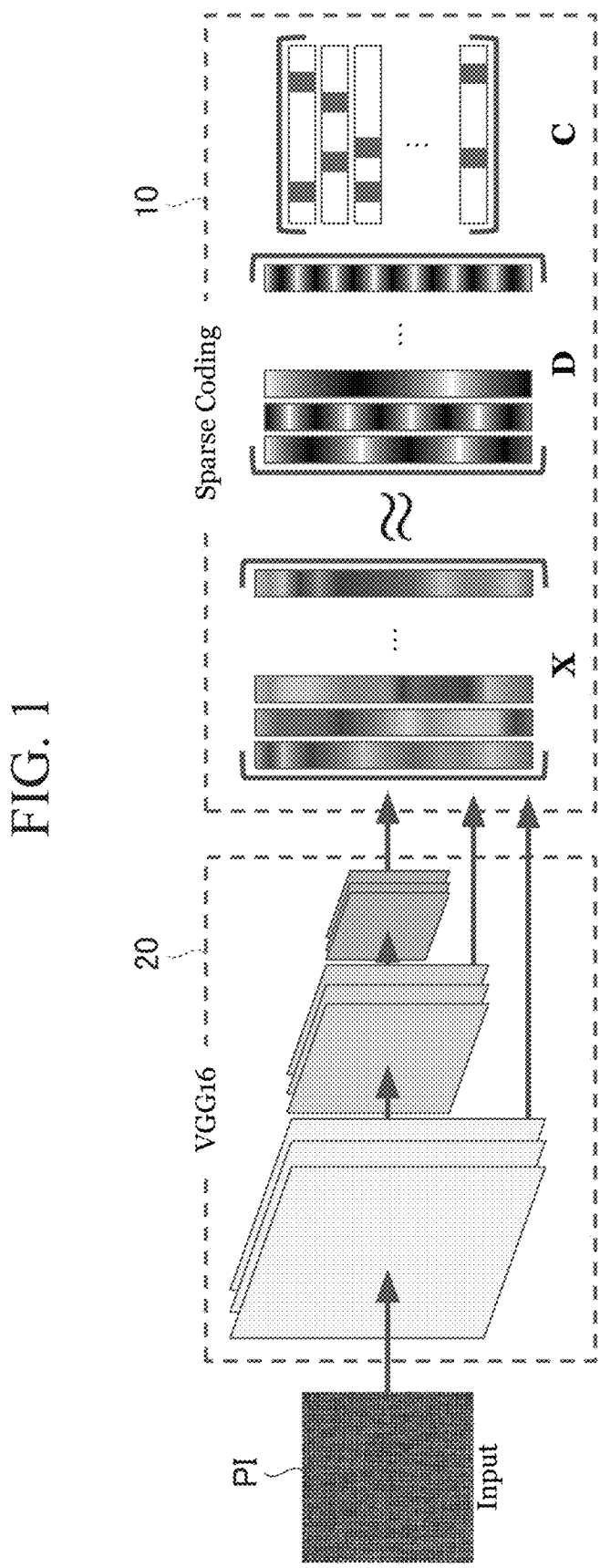
FIG. 1 is a diagram illustrating an outline of an operation method according to a first embodiment.

FIG. 1 is a diagram illustrating an outline of an operation method according to the first embodiment. The outline of the operation method according to the first embodiment will be described below with reference to the drawing. The operation method according to the first embodiment is for determining a feature of an input image PI. For example, the operation method according to the first embodiment is for determining whether an input image PI is a normal image. An image with a high spatial frequency can be suitably used as the input image PI. An image with a high spatial frequency is, for example, an image obtained by imaging a fabric having a pattern such as a predetermined land pattern or fabric pattern. Examples of the fabric having a pattern such as a predetermined land pattern or woven pattern include a fabric such as a carpet, tiles, and leather. In the following description, it is assumed that the input image PI is an image obtained by imaging a fabric.

In the following description, anomalies of an image widely include anomalies such as holes, cracks, tears, frayed spots, seam failures, stains, and discoloration. A normal image is an image other than an anomaly image and is an image obtained by imaging a fabric without an anomaly such as holes, cracks, tears, frayed spots, seam failures, stains, or discoloration.

The type of the input image PI is not limited to an example of an image obtained by imaging a fabric or the like. A normal image and an anomaly image can be arbitrarily set in a detectable range by a user, and the operation method according to the first embodiment can be applied to any image. For example, the operation method according to the first embodiment can also be applied to detection of a normal product with higher precision or quality instead of detection of an anomaly.

An operation device which is used for the operation method according to the first embodiment includes an operation unit 10 and a feature quantity extracting unit 20.

The feature quantity extracting unit 20 extracts a feature quantity of an input image PI. Here, a feature quantity acquired from the input image PI by the feature quantity extracting unit 20 is a pattern or experimental rule which is autonomously recognized by a machine or a program by repeatedly learning data in a deep learning network. That is, a feature quantity is a quantity obtained by digitalizing a feature of input data. The feature quantity extracted by the deep learning network may have, for example, a spatial correlation or a color correlation with the input image PI. For example, the feature quantity acquired from the input image PI by the feature quantity extracting unit 20 may be a feature quantity based on a frequency of the input image PI In the following description, the feature quantity will also be described as a feature.

The feature quantity extracting unit 20 extracts the feature quantity of the input image PI, for example, using a neural network. For example, VGG16 can be used as the neural network used for the feature quantity extracting unit 20. VGG16 is a convolutional neural network (so-called CNN) including a total of 16 layers. As a trained model, an existing trained model may be used or a model obtained by additionally training the existing trained model may be used. When additional training is performed, it is preferable that a normal image be used as an input image.

The feature quantity extracting unit 20 is not limited to VGG16. The feature quantity extracting unit 20 preferably includes a deep learning layer that can reduce an image. The feature quantity extracting unit 20 may use, for example, RESNET50 instead of VGG16. RESNET50 is a CNN including a total of 50 convolutional layers. The feature quantity extracting unit 20 may be constituted by a single CNN or may be constituted by a plurality of CNNs. When the feature quantity extracting unit 20 includes a plurality of CNNs, the feature quantity extracting unit 20 may be selectively switched between a plurality of deep learning models according to a detection object or may be constituted by combining a plurality of deep learning models.

When the feature quantity extracting unit 20 includes a plurality of deep learning layers, one or more deep learning layers may be quantized. In order to quantize at least a part of the deep learning layers, for example, a quantization operation for quantizing input data (activation) and weights used for convolutional operations included in the deep learning layer to values of equal to or less than 8 bits may be provided in each deep learning layer.

The quantization operation can employ a result of the convolutional operation as an input and provide a result of the quantization operation as an input of a next deep learning layer. By employing this configuration, it is possible to further reduce a calculation load in comparison with a case in which quantization is not performed.

The feature quantity extracting unit 20 acquires a feature quantity from the deep learning layer to which the input image PI is input, that is, a plurality of intermediate layers of the convolutional neural network.

The feature quantity extracting unit 20 outputs the extracted feature quantity to the operation unit 10. When the feature quantity extracting unit 20 includes a plurality of convolutional layers, the feature quantity extracting unit 20 may output feature quantities extracted by the convolutional layers to the operation unit 10. When the feature quantity extracting unit 20 includes a plurality of convolutional layers, the feature quantity extracting unit 20 may output feature quantities extracted by one or more convolutional layers out of the plurality of convolutional layers to the operation unit 10.

The feature quantity extracting unit 20 may extract feature quantities of a plurality of channels from one convolutional layer.

The operation unit 10 compresses information on each feature quantity output from the feature quantity extracting unit 20 and reconstructs the compressed information. The operation unit 10 calculates a difference between the original information and the reconstructed information as a reconstruction error. The operation unit 10 determines whether the input image PI is a normal image on the basis of the calculated reconstruction error.

For example, sparse coding can be employed by the operation unit 10. In sparse coding, elements (matter) of information are provided as a dictionary. In the sparse coding, an image is compressed by expressing input information as a combination of elements stored in the dictionary. When the input image PI is a normal image, the input image can be reconstructed by combining specific elements stored in the dictionary. In other words, when the input image PI is a normal image, a large error is not caused even when information is compressed and then reconstructed using sparse coding.

On the other hand, when the input image PI is an anomaly image, the input image cannot be completely reconstructed from specific elements constituting a normal image. In other words, when the input image PI is an anomaly image, a large error is caused when information is compressed and then reconstructed using sparse coding.

The operation unit 10 can calculate a difference between the original information and the reconstructed information as a reconstruction error and determine whether the input image PI is a normal image on the basis of the calculated reconstruction error.

In this embodiment, elements constituting information stored in the dictionary are generated on the basis of a normal image. Here, a normal image is an image without singular elements as illustrated in FIG. 13. In other words, a normal image is an average image in images which can be input. Accordingly, in the sparse coding using a dictionary, a reconstructed image is an image including a variance which is a predetermined difference and is a normal image or an average image close to a normal image regardless of whether the input image is an anomaly image. As a result, the reconstruction error which is a difference between original information and reconstructed information and which is calculated by the operation unit 10 is calculated on the basis of a difference between an input image and a predetermined average image supposed in advance.

An existing technique such as sparse coding can be used as an algorithm of the operation unit 10, and a dictionary is preferably prepared by a user according to the input image PI.

Figure 2:
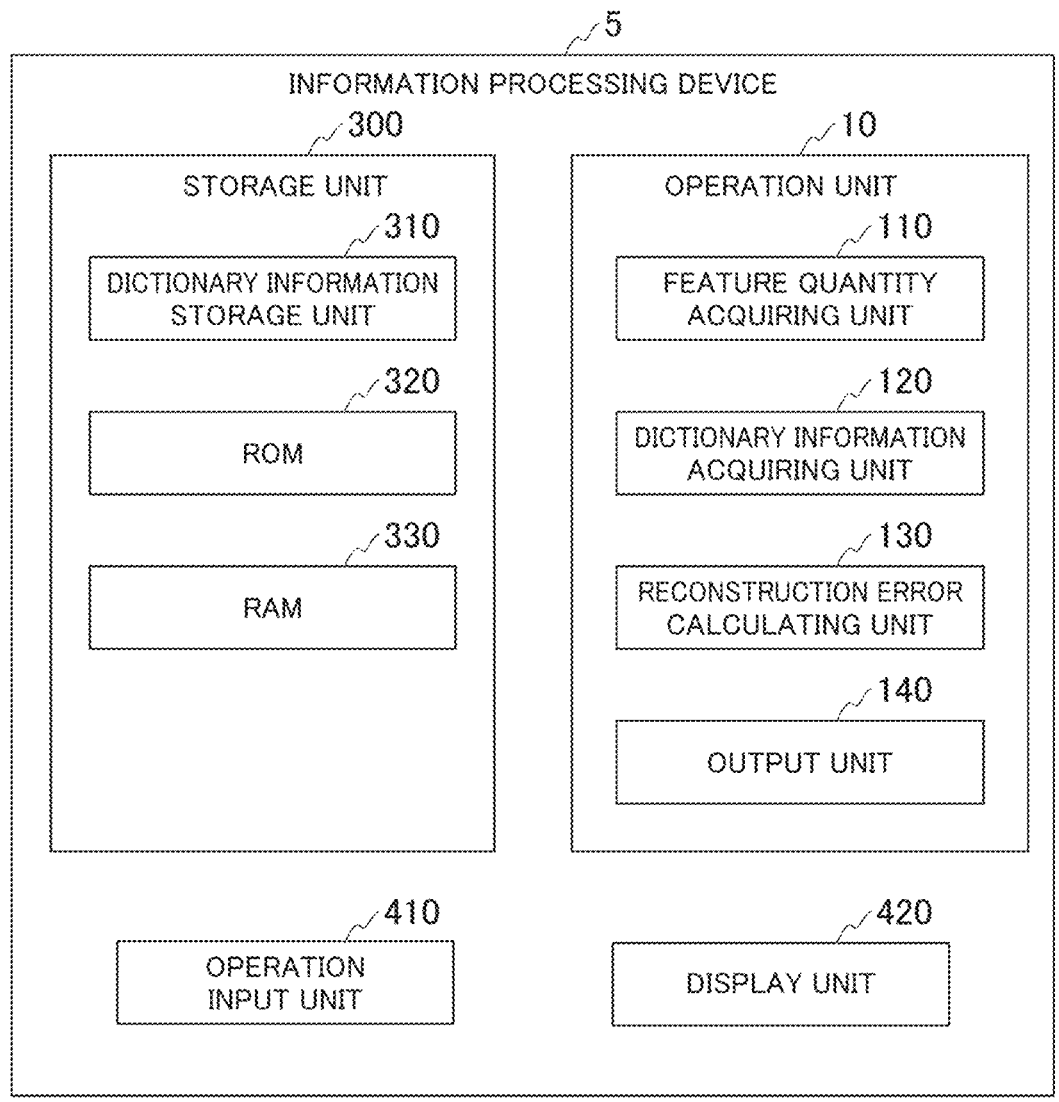
FIG. 2 is a diagram illustrating an example of a functional configuration of an information processing device according to the first embodiment.

FIG. 2 is a diagram illustrating an example of a functional configuration of an information processing device 5 according to the first embodiment. An example of the functional configuration of the information processing device 5 according to the first embodiment will be described below with reference to the drawing. The information processing device 5 determines a feature of an input image PI.

The information processing device 5 includes a storage unit 300, an operation unit 10, an operation input unit 410, and a display unit 420.

The storage unit 300 is realized by a flash memory, an electrically erasable programmable read-only memory (EEPROM), a read-only memory (ROM), a random access memory (RAM), or the like. All or some functions of the storage unit 300 may be provided in an external device such as a cloud server and may be connected to the operation unit 10 by a communication line. The storage unit 300 includes a dictionary information storage unit 310, a ROM 320, and a RAM 330.

The operation input unit 410 is a device that is used for a user to input an instruction to the operation unit 10 or the like. The operation input unit 410 is a known input device such as a touch panel, a keyboard, and a mouse. For example, information input to the operation input unit 410 is transmitted to the operation unit 10.

The display unit 420 displays predetermined information. The display unit 420 may be, for example, a known monitor such as an LCD display. The display unit 420 displays a graphical user interface (GUI) image generated by the operation unit 10 or a console screen for receiving a command or the like. When the operation unit 10 requires an input of information from a user, the display unit 420 displays a message urging a user to input information via the operation input unit 410 or a GUI image which is required for inputting information.

Figure 3:
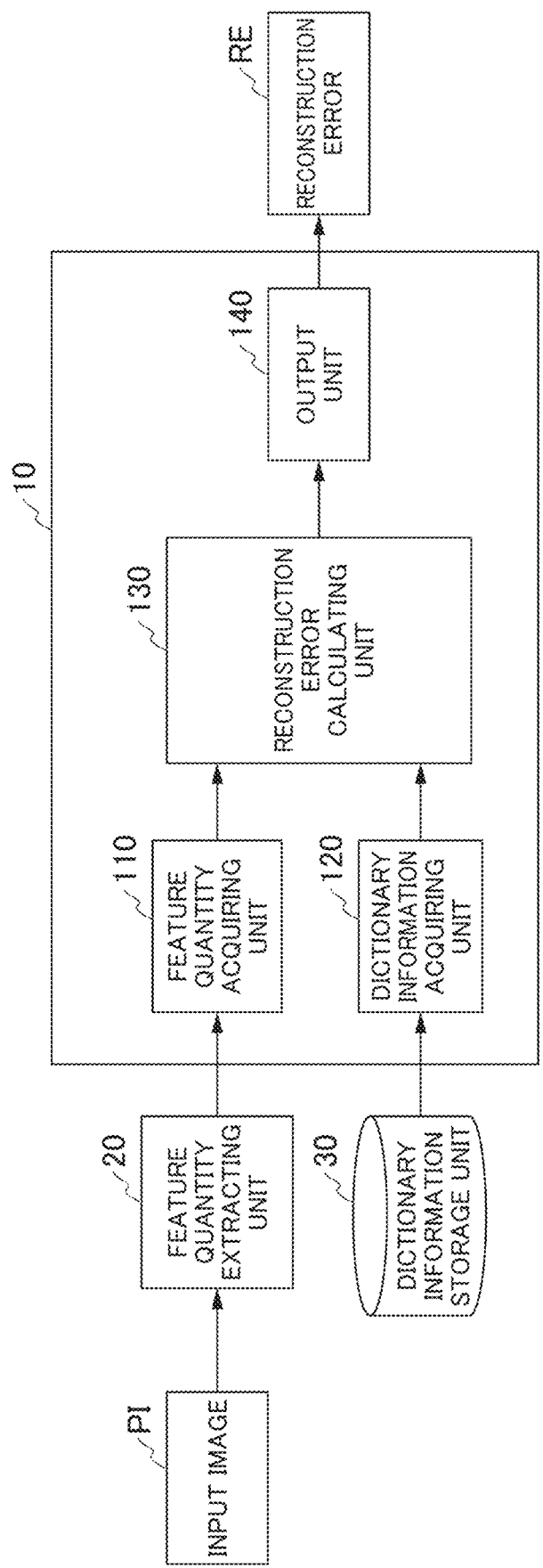
FIG. 3 is a diagram illustrating an example of a functional configuration of an operation device according to the first embodiment.

FIG. 3 is a diagram illustrating an example of a functional configuration of an operation device (the operation unit 10) according to the first embodiment. An example of the functional configuration of the operation unit 10 will be described below with reference to the drawings. At least some functions of the operation unit 10 may be realized in hardware including circuitry such as a large scale integration (LSI), an application-specific integrated circuit (ASIC), or a field-programmable gate array (FPGA).

The operation unit 10 includes a feature quantity acquiring unit 110, a dictionary information acquiring unit 120, a reconstruction error calculating unit 130, and an output unit 140.

Individual operations of the deep learning layers are simple but a calculational load for one input may be very large. Accordingly, at least operations in the feature quantity acquiring unit 110, particularly, operations in a plurality of deep learning layers, out of a plurality of functions of the operation unit 10A can be preferably performed using a dedicated accelerator. More specifically, a convolutional operation and a quantization operation included in each deep learning layer are preferably performed using a dedicated accelerator circuit.

The accelerator is controlled by a predetermined processor and operates in combination with a predetermined program.

The feature quantity acquiring unit 110 acquires a feature quantity extracted from an input image PI. The feature quantity acquiring unit 110 acquires a feature quantity extracted from the input image PI by the feature quantity extracting unit 20.

The dictionary information acquiring unit 120 acquires dictionary information. For example, the dictionary information acquiring unit 120 acquires dictionary information using a predetermined communication mode from a dictionary information storage unit 30 in which dictionary information is stored. The dictionary information includes a plurality of elements of which each is a pattern of a plurality of features constituting the feature quantity extracted from an image. That is, the dictionary information acquiring unit 120 acquires dictionary information including a plurality of elements of which each is a pattern of a plurality of features constituting the feature quantity extracted from an image.

For example, the dictionary information may include a plurality of elements of which each is a pattern of a plurality of pixels constituting an image. That is, the dictionary information acquiring unit 120 may acquire dictionary information including a plurality of elements of which each is a pattern of a plurality of pixels constituting an image. The dictionary information storage unit 30 may be provided in an external device. In this case, the dictionary information is acquired via a network.

The reconstruction error calculating unit 130 performs an operation based on the acquired feature quantity and the acquired dictionary information. Specifically, the reconstruction error calculating unit 130 calculates a reconstruction error RE when the feature quantity acquired by the feature quantity acquiring unit 110 has been compressed and reconstructed. The reconstruction error calculating unit 130 compresses and reconstructs a feature quantity on the basis of the dictionary information acquired by the dictionary information acquiring nit 120. That is, the reconstruction error calculating unit 130 calculates the reconstruction error RE on the basis of the acquired feature quantity and the acquired dictionary information.

Here, the reconstruction error which is a difference between original information and reconstructed information and which is calculated by the operation unit 10 is calculated on the basis of a difference between an input image and a predetermined average image supposed in advance. In this case, the dictionary information acquiring unit 120 acquires a difference from an average determined in advance on the basis of a normal image as the dictionary information. The reconstruction error calculating unit 130 calculates the reconstruction error RE on the basis of a difference between the acquired feature quantity and the average determined in advance on the basis of a normal image.

The output unit 140 outputs a calculation result from the reconstruction error calculating unit 130. For example, the output unit 140 outputs the reconstruction error RE calculated by the reconstruction error calculating unit 130.

Figure 4:
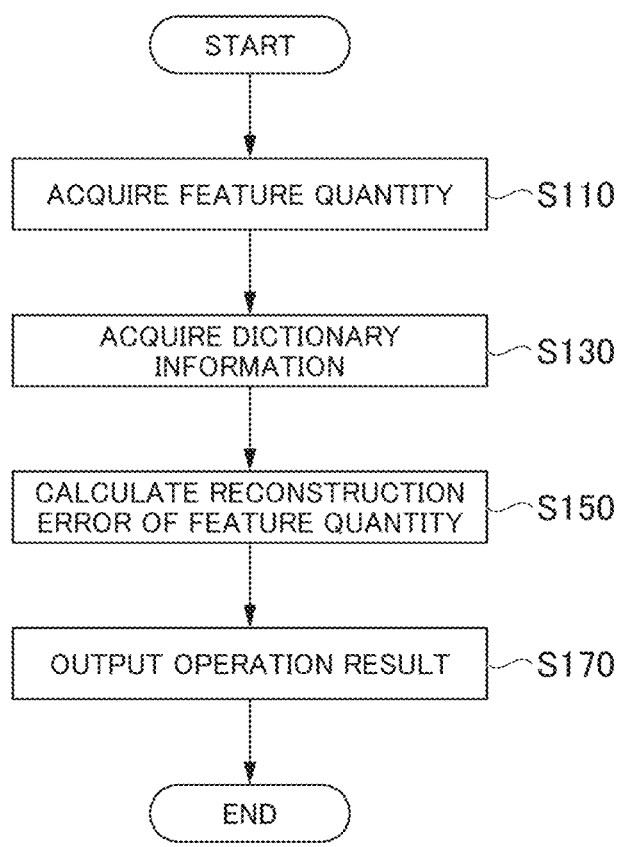
FIG. 4 is a diagram illustrating an example of an operation flow of an operation program according to the first embodiment.

FIG. 4 is a diagram illustrating an example of an operation flow of an operation program according to the first embodiment. An operation flow of the operation program according to the first embodiment will be described below with reference to the drawing.

(Step S110) The feature quantity acquiring unit 110 acquires a feature quantity extracted from an input image PI. Step S110 is also referred to as a feature quantity acquiring step.

(Step S130) The dictionary information acquiring unit 120 acquires dictionary information including a plurality of elements of which each is a pattern of a plurality of pixels constituting an image. Step S130 is also referred to as a dictionary information acquiring step.

(Step S150) The reconstruction error calculating unit 130 calculates a reconstruction error RE on the basis of the acquired feature quantity and the acquired dictionary information. For example, the reconstruction error calculating unit 130 calculates the reconstruction error RE by performing an optimization operation of calculating an optimal value on the basis of a predetermined function. Step S150 is also referred to as a reconstruction error calculating step.

(Step S170) The output unit 140 outputs a calculation result from the reconstruction error calculating unit 130. Step S170 is also referred to as an output step.

It is possible to detect an anomaly of other characteristics by repeatedly performing the operation of Step S150 a plurality of times and calculating the reconstruction error in Step S170 in each operation.

Second Embodiment

Hereinafter, a second embodiment of the invention will be described with reference to the accompanying drawings.

Figure 5:
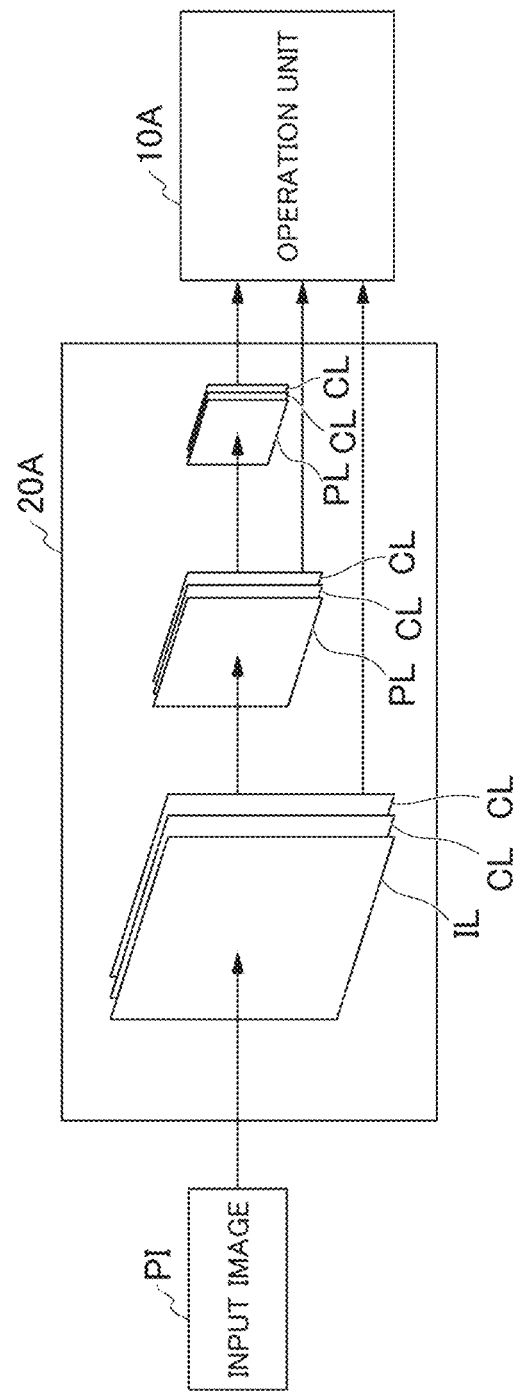
FIG. 5 is a diagram illustrating an outline of an operation method according to a second embodiment.

FIG. 5 is a diagram illustrating an outline of an operation method according to the second embodiment. The outline of the operation method according to the second embodiment will be described below with reference to the drawing. The operation method according to the second embodiment is different from the operation method according to the first embodiment, in that a plurality of feature quantities are extracted from an input image PI and a reconstruction error RE is calculated for the plurality of extracted feature quantities. The second embodiment is different from the first embodiment in that a feature quantity extracting unit 20A is provided instead of the feature quantity extracting unit 20 and an operation unit 10A is provided instead of the operation unit 10. In the following description, the same elements as in the first embodiment will be referred to by the same reference signs and thus a description thereof will be omitted.

The feature quantity extracting unit 20A includes an input layer IL, a plurality of convolutional layers CL, and a plurality of pooling layers PL. The feature quantity extracting unit 20A extracts a feature quantity from the plurality of convolutional layers CL which are different layers and outputs the extracted feature quantities to the operation unit 10A. Feature quantities of a plurality of channels are extracted from the layers and are output.

For example, when the feature quantity extracting unit 20A is constituted by VGG16, feature quantities of 128 channels from a fourth layer out of 16 convolutional layers, 256 channels from a seventh layer, and 512 channels from a tenth layer (that is, total 896 channels) are extracted and output.

The operation unit 10A calculates a reconstruction error RE for the acquired feature quantities of a plurality of channels. For example, when feature quantities of 896 channels are acquired by the feature quantity extracting unit 20A, the operation unit 10A performs compression and reconstruction for each channel and calculates the reconstruction error RE. The operation unit 10A calculates the reconstruction error RE of the input image PI by summing the differences between the calculated reconstruction errors RE.

Figure 6:
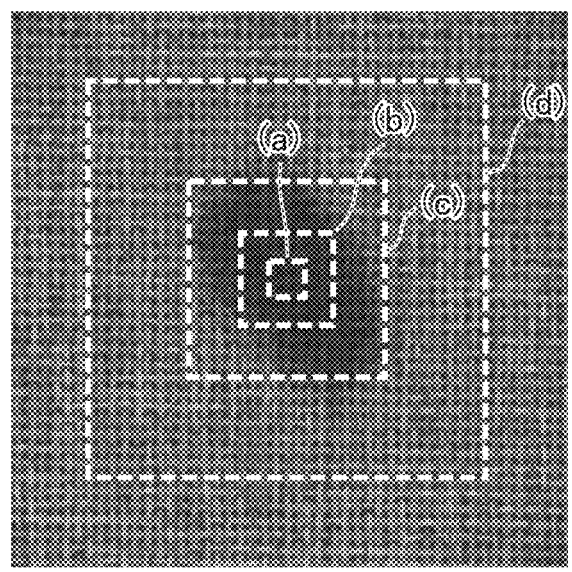
FIG. 6 is a diagram illustrating a feature quantity according to the second embodiment.

FIG. 6 is a diagram illustrating feature quantities according to the second embodiment. Feature quantities according to the second embodiment will be described below with reference to the drawing. In the second embodiment, since feature quantities extracted from a plurality of convolutional layers are used, the feature quantities are extracted from the input image PI in multiple scales.

Rectangles illustrated in the drawing represent receptive fields of the feature quantities extracted using the sparse coding. The range indicated by (a) represents a receptive field of the feature quantities output through the sparse coding. The range indicated by (b) represents a receptive field of the fourth layer, the range indicated by (c) represents a receptive field of the seventh layer, and the range indicated by (d) represents a receptive field of the tenth layer. That is, feature quantities in different ranges in the input image PI are extracted as the feature quantities according to the second embodiment.

Figure 7:
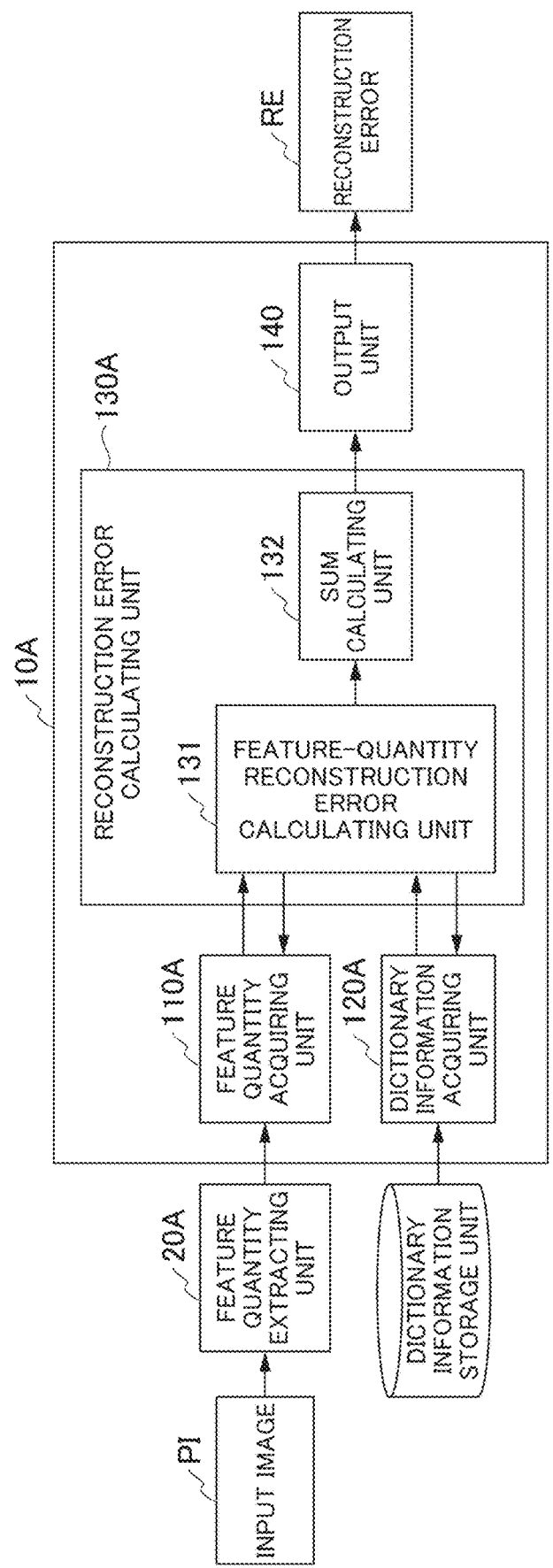
FIG. 7 is a diagram illustrating an example of a functional configuration of an information processing device according to the second embodiment.

FIG. 7 is a diagram illustrating an example of a functional configuration of an operation device (the operation unit 10A) according to the second embodiment. An example of the functional configuration of the operation unit 10A will be described below with reference to the drawing. The operation unit 10A is different from the operation unit 10 in that a feature quantity acquiring unit 110A is provided instead of the feature quantity acquiring unit 110, a dictionary information acquiring unit 120A is provided instead of the dictionary information acquiring unit 120, and a reconstruction error calculating unit 130A is provided instead of the reconstruction error calculating unit 130. In the description of the operation unit 10A, the same elements as in the operation unit 10 will be referred to by the same reference signs and a description thereof will be omitted.

At least operations in the feature quantity acquiring unit 110A, particularly operations in a plurality of deep learning layers, out of a plurality of functions of the operation unit 10 can be preferably performed using a dedicated accelerator. More specifically, a convolutional operation and a quantization operation included in each deep learning layer are preferably performed using a dedicated accelerator circuit.

The accelerator is controlled by a predetermined processor and operates in combination with a predetermined program.

The feature quantity acquiring unit 110A acquires a plurality of feature quantities from the feature quantity extracting unit 20A. The plurality of feature quantities are feature quantities acquired from the same input image PI. That is, the feature quantity acquiring unit 110A acquires a plurality of feature quantities extracted from the input image PI. The feature quantity acquiring unit 110A outputs one of the acquired feature quantities to the reconstruction error calculating unit 130A.

The reconstruction error calculating unit 130A includes a feature-quantity reconstruction error calculating unit 131 and a sum calculating unit 132.

The feature-quantity reconstruction error calculating unit 131 acquires a feature quantity from the feature quantity acquiring unit 110A, acquires dictionary information from the dictionary information acquiring unit 120A, and calculates a reconstruction error RE of the feature quantity. The feature-quantity reconstruction error calculating unit 131 calculates the reconstruction error RE for each acquired feature quantity. In this embodiment, different dictionary information is prepared according to the feature quantities. The feature-quantity reconstruction error calculating unit 131 outputs the calculated reconstruction errors RE to the sum calculating unit 132 and notifies the feature quantity acquiring unit 110A and the dictionary information acquiring unit 120A that calculation of the reconstruction errors RE has been completed.

When a notification indicating that calculation of the reconstruction errors RE has been completed is received from the feature-quantity reconstruction error calculating unit 131, the feature quantity acquiring unit 110A outputs a feature quantity which has not been output to the feature-quantity reconstruction error calculating unit 131 out of the plurality of feature quantities acquired from the feature quantity extracting unit 20A to the feature-quantity reconstruction error calculating unit 131.

When a notification indicating that calculation of the reconstruction errors RE has been completed is received from the feature-quantity reconstruction error calculating unit 131, the dictionary information acquiring unit 120A outputs dictionary information based on the feature quantity output from the feature quantity acquiring unit 110A to the feature-quantity reconstruction error calculating unit 131 to the feature-quantity reconstruction error calculating unit 131.

The sum calculating unit 132 calculates the reconstruction error RE of the input image PI by performing an operation based on the plurality of reconstruction errors RE calculated by the feature-quantity reconstruction error calculating unit 131. For example, the sum calculating unit 132 calculates the reconstruction error RE of the input image PI by summing the plurality of reconstruction errors RE calculated by the feature-quantity reconstruction error calculating unit 131.

The sum calculating unit 132 may be configured to calculate the reconstruction error RE of the input image PI by performing another operation on the basis of the plurality of reconstruction errors RE calculated by the feature-quantity reconstruction error calculating unit 131. For example, the reconstruction error RE may be calculated using a maximum value, a difference between a maximum value and a minimum value, a variance, or the like. When a plurality of reconstruction errors RE are summed, the reconstruction errors RE may be summed with weighting based on whether they are output from a predetermined feature quantity (layer). For example, when a feature quantities calculated from a predetermined layer includes much noise and detection accuracy decreases, the reconstruction errors may be summed with small weighting in comparison with the reconstruction errors calculated from other feature quantities.

For example, the sum calculating unit 132 may be configured to calculate the reconstruction error RE of the input image PI by summing the reconstruction errors RE for each position of a feature. In this case, the reconstruction error RE of the input image PI is preferably calculated using a two-dimensional reconstruction error matrix.

For example, the sum calculating unit 132 may be configured to sum values of highest n reconstruction errors RE (where n is a natural number) and to set the summed value as the final reconstruction error.

The output unit 140 outputs the calculated reconstruction error RE of the input image PI as a result.

Here, the feature-quantity reconstruction error calculating unit 131 calculates the reconstruction error RE of the input image PI on the basis of the elements which are generated on the basis of a normal image. Accordingly, in sparse coding using a dictionary, a reconstructed image is an image including a variance which is a predetermined difference and is a normal image or an average image close to a normal image regardless of whether the input image is an anomaly image. As a result, the reconstruction error which is the difference between original information and reconstructed information and which is calculated by the operation unit 10 is calculated on the basis of the difference between an input image and a predetermined average image supposed in advance.

Figure 8:
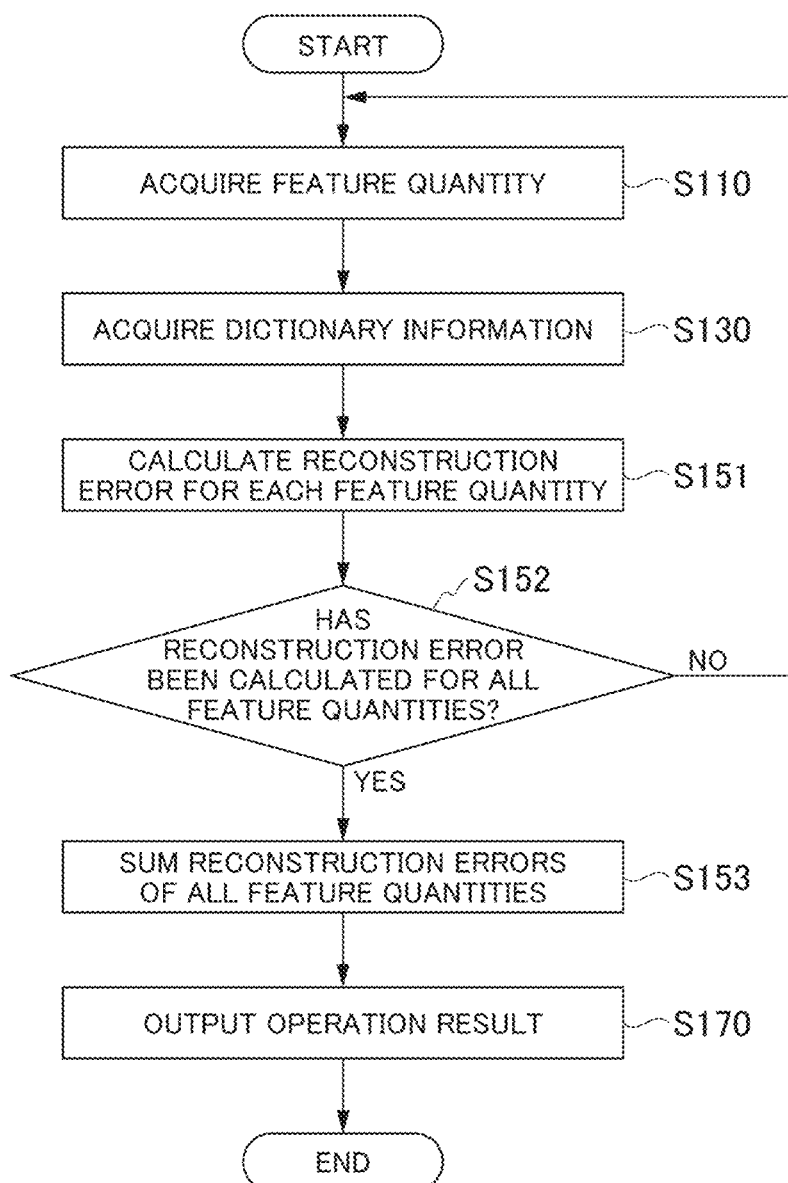
FIG. 8 is a diagram illustrating an example of an operation flow of an operation program according to the second embodiment.

FIG. 8 is a diagram illustrating an example of an operation flow of an operation program according to the second embodiment. An operation flow of the operation program according to the second embodiment will be described below with reference to the drawing. The operation flow of the operation program according to the second embodiment is different from the operation flow of the operation program according to the first embodiment, in that Steps S151 to S153 are provided instead of Step S150.

(Step S151) The feature-quantity reconstruction error calculating unit 131 acquires feature quantities from the feature quantity acquiring unit 110A, acquires dictionary information based on the feature quantities from the dictionary information acquiring unit 120A, and calculates a reconstruction error RE for each feature quantity.

(Step S152) When the reconstruction error RE has been calculated for all the feature quantities acquired by the feature quantity acquiring unit 110A (that is, Step S152: YES), the feature-quantity reconstruction error calculating unit 131 causes the operation flow to proceed to Step S153. When a feature quantity for which the reconstruction error RE has not been calculated remains among all the feature quantities acquired by the feature quantity acquiring unit 110A (that is, Step S152: NO), the feature-quantity reconstruction error calculating unit 131 causes the operation flow to proceed to Step S110.

(Step S153) The sum calculating unit 132 sums a plurality of reconstruction errors RE calculated by the feature-quantity reconstruction error calculating unit 131 and calculates a reconstruction error RE of the input image PI.

Third Embodiment

Hereinafter, a third embodiment of the invention will be described with reference to the accompanying drawings.

Figure 9:
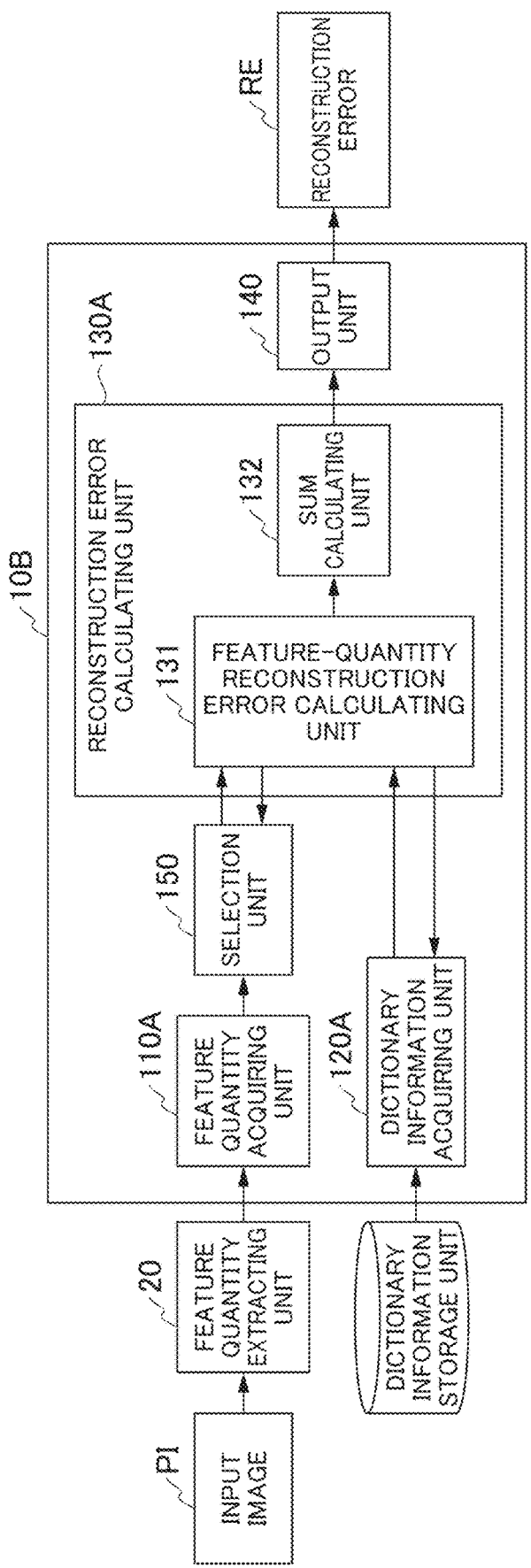
FIG. 9 is a diagram illustrating an example of a functional configuration of an operation device according to a third embodiment.

FIG. 9 is a diagram illustrating an example of a functional configuration of an operation device (an operation unit 10B) according to the third embodiment. An example of a functional configuration of the operation unit 10B will be described below with reference to the drawing. The operation unit 10B is different from the operation unit 10A, in that a selection unit 150 is additionally provided. In the description of the operation unit 10B, the same elements as in the operation unit 10A will be referred to by the same reference signs and a description thereof will be omitted.

The selection unit 150 selects a predetermined number of feature quantities out of the feature quantities acquired by the feature quantity acquiring unit 110A and outputs the selected feature quantities to the reconstruction error calculating unit 130A. For example, when the feature quantity extracting unit 20A acquires feature quantities of 896 channels, the feature quantity acquiring unit 110A outputs a predetermined number of feature quantities out thereof to the reconstruction error calculating unit 130A. That is, in the third embodiment, the reconstruction error calculating unit 130A calculates the reconstruction error RE using a smaller number of feature quantities than the number of feature quantities acquired by the feature quantity acquiring unit 110A.

The selection unit 150 may be configured to select a predetermined type of feature quantities and to output the selected feature quantities to the reconstruction error calculating unit 130A. The selection unit 150 may be configured to output feature quantities which are randomly selected on the basis of a predetermined function out of the feature quantities acquired by the feature quantity acquiring unit 110A to the reconstruction error calculating unit 130A.

The selection unit 150 may be configured to include a plurality of modes such that two or more number can be selected as the number of feature quantities to be selected. Specifically, when detection accuracy has priority in comparison with a detection rate on the basis of an input from a user or a predetermined function, control may be performed such that the number of feature quantities to be selected increases. When successive detection is performed, the number of feature quantities to be selected may change with the elapse of time.

Fourth Embodiment

Hereinafter, a fourth embodiment of the invention will be described with reference to the accompanying drawings.

Figure 10:
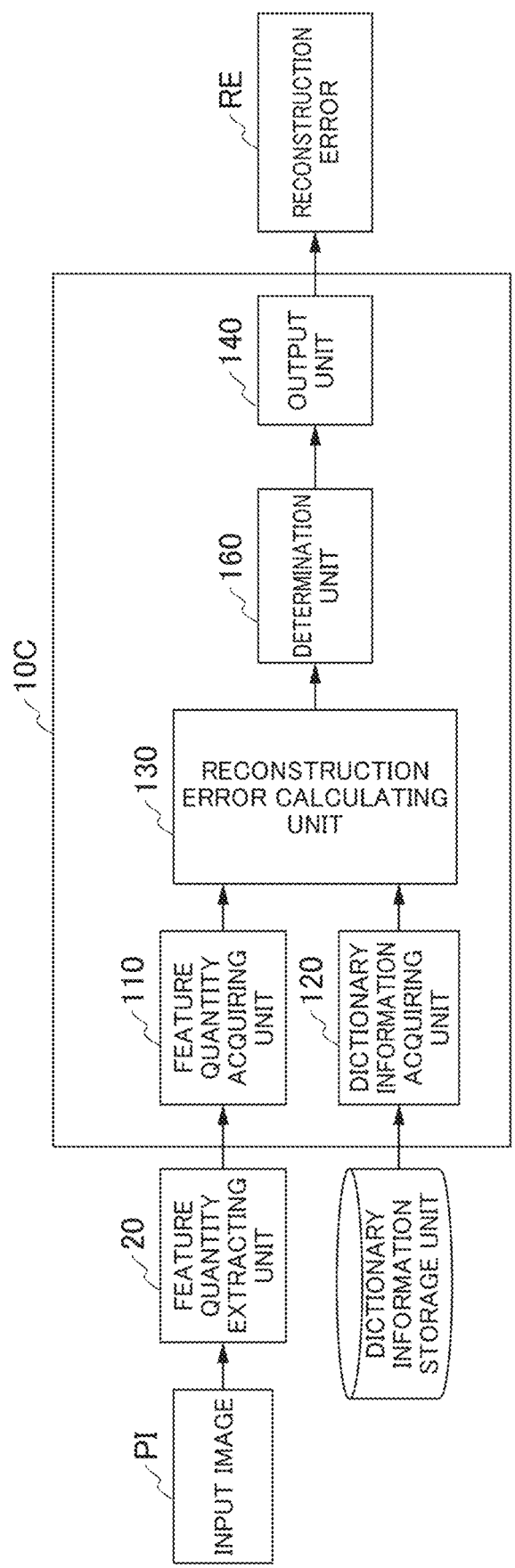
FIG. 10 is a diagram illustrating an example of a functional configuration of an operation device according to a fourth embodiment.

FIG. 10 is a diagram illustrating an example of a functional configuration of an operation device (an operation unit 10C) according to the fourth embodiment. An example of a functional configuration of the operation unit 10C will be described below with reference to the drawing. The operation unit 10C is different from the operation unit 10, in that a determination unit 160 is additionally provided. In the description of the operation unit 10C, the same elements as in the operation unit 10 will be referred to by the same reference signs and a description thereof will be omitted.

The determination unit 160 determines whether an input image PI is a normal image on the basis of a reconstruction error RE calculated by the reconstruction error calculating unit 130. Specifically, the determination unit 160 compares the reconstruction error RE calculated by the reconstruction error calculating unit 130 with a predetermined threshold value, determines that the input image PI is an anomaly image when the reconstruction error RE is greater than the predetermined threshold value, and determines that the input image PI is a normal image when the reconstruction error RE is less than the predetermined threshold value. That is, the determination unit 160 determines whether the input image PI is a normal image on the basis of the predetermined threshold value and the reconstruction error RE calculated by the reconstruction error calculating unit 130.

The output unit 140 outputs a result of determination from the determination unit 160. The output result may include information such as a detection time, details of an anomaly, an anomaly rate, a position at which an anomaly occurs, and an anomaly level in addition to a result of determination indicating whether the input image is an anomaly image. The input image which is determined to be an anomaly image may be output together. The output unit 140 may be configured to output the output result to a predetermined server via a network.

Advantages of Embodiments

Results obtained by performing anomaly detection using the operation method according to the embodiment will be described below with reference to FIGS. 11 and 12. Results obtained by performing anomaly detection using the operation method according to the embodiment with images illustrated in FIG. 11 as input images PI are illustrated in FIG. 12.

Figure 11:
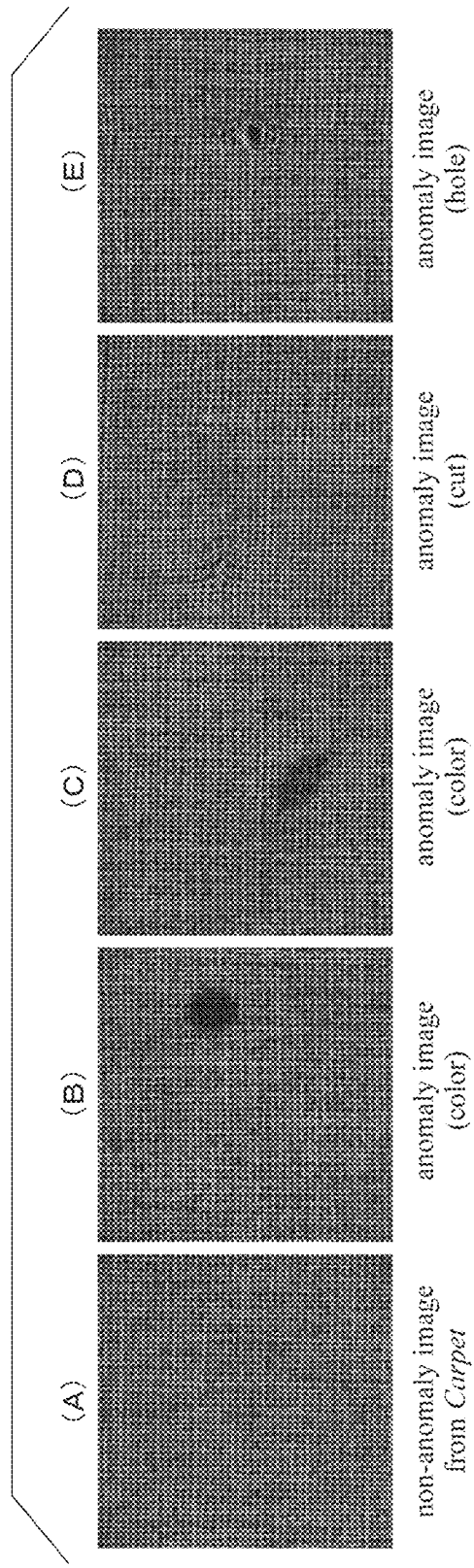
FIG. 11 is a diagram illustrating an example of a normal image and an anomaly image which are used to detect an anomaly using an operation method according to an embodiment.

FIG. 11 is a diagram illustrating an example of a normal image and an anomaly image which are used to detect an anomaly using the operation method according to the embodiment.

Figure 12:
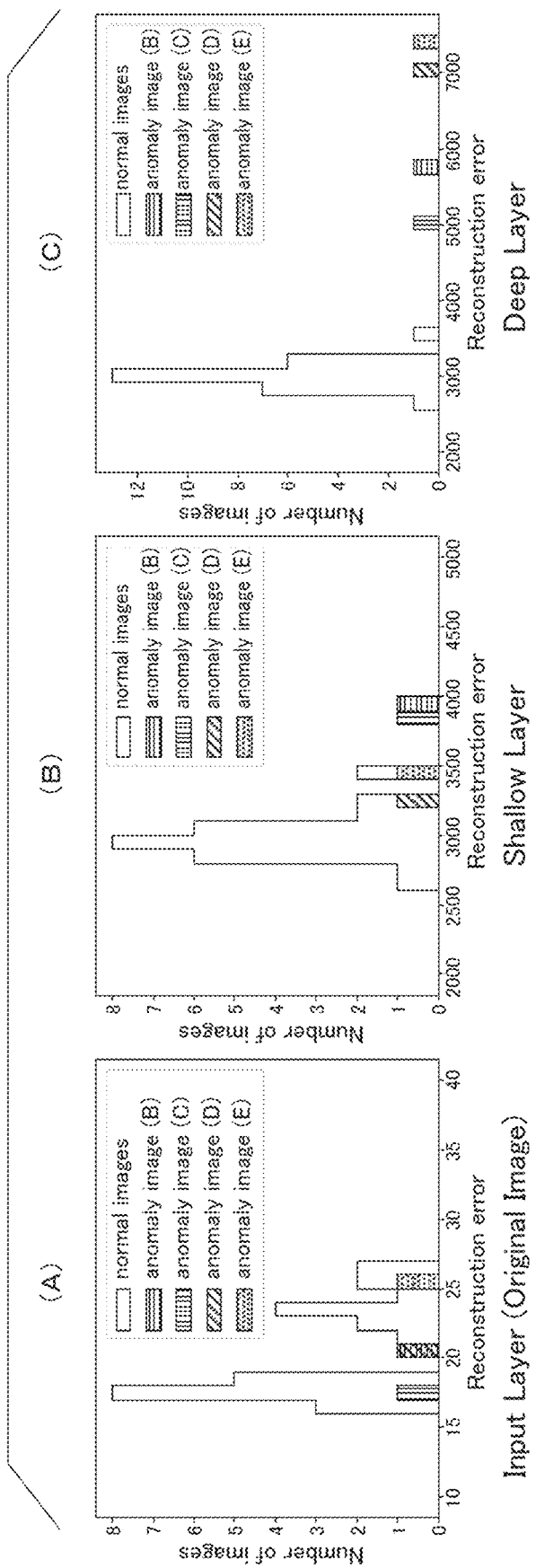
FIG. 12 is a diagram illustrating advantages of the operation method according to the embodiment.

FIG. 12 is a diagram illustrating advantages of the operation method according to the embodiment.

The image illustrated in FIG. 11(A) illustrates an example in which an input image PI is a normal image. The images illustrated in FIGS. 11(B) to 11(E) illustrate an example in which an input image PI is an anomaly image. In this example, the input image PI is an image obtained by imaging a carpet.

FIGS. 11(B) and 11(c) illustrate an example in which there is a stain in the carpet. FIGS. 11(B) and 11(c) illustrate images stains of different sizes and degrees. FIG. 11(D) illustrates an example in which there is a crack in the carpet. FIG. 11(E) illustrates an example in which there is a hole in the carpet.

Results obtained by performing anomaly detection using the operation method according to the embodiment on a plurality of normal input images PI and the anomaly images illustrated in FIG. 11 are illustrated in FIG. 12. In the graph illustrated in FIG. 12, the horizontal axis represents the reconstruction error RE and the vertical axis represents the number of input images PI.

FIG. 12(A) illustrates a result obtained by performing sparse coding on the input images PI (that is, a result in the related art). As illustrated in the drawing, the range of the reconstruction errors RE of the normal input images PI range from 16 to 26. The reconstruction errors RE of the anomaly input images PI illustrated in FIGS. 11(B) to 11(E) similarly range from 16 to 26, and thus a normal image and an anomaly image cannot be distinguished according to the related art.

FIGS. 12(B) and 12(C) illustrate results obtained by performing anomaly detection using the operation method according to the embodiment. FIG. 12(B) illustrates an example in which spare coding is performed on only feature quantities extracted from a shallow layer, and FIG. 12(C) illustrates an example in which sparse coding is also performed on feature quantities extracted from a deep layer.

In the example illustrated in FIG. 12(B), the reconstruction error RE of anomaly input images PI may be distinguished from the range of the reconstruction error RE of normal input images PI depending on the type of the anomaly input images PI, and the reconstruction error RE of anomaly input images PI may be included in the range of the reconstruction error RE of normal input images PI.

In the example illustrated in FIG. 12(C), in any anomaly input images PI, the reconstruction error RE of the anomaly input images PI departs from the range of the reconstruction error RE of normal input images PI. That is, according to the embodiments, it is possible to perform anomaly detection with higher robustness by causing the operation unit 10 to extract feature quantities from a deep layer in addition to feature quantities from a shallow layer and to perform comprehensive determination.

Conclusion of Embodiments

According to the aforementioned embodiments, the operation unit 10 acquires a feature quantity extracted from an input image PI using the feature quantity acquiring unit 110 provided therein, and acquires dictionary information including a plurality of elements of which each is a pattern of a plurality of pixels constituting an image using the dictionary information acquiring unit 120 provided therein. The operation unit 10 calculates the reconstruction error RE on the basis of the acquired feature quantity and the acquired dictionary information using the reconstruction error calculating unit 130 provided therein, and outputs the calculated reconstruction error RE using the output unit 140 provided therein. According to the embodiments, the reconstruction error RE is calculated from the feature quantity extracted from the input image PI instead of calculating the reconstruction error RE from image information of the input image PI. Accordingly, even when the input image PI is an image of which the most is occupied by an anomaly part, it is possible to detect an anomaly therefrom. That is, according to this embodiment, it is possible to provide an anomaly detection method with high robustness that can determine whether an input image PI is a normal image regardless of a proportion of an anomaly part in the image.

According to the aforementioned embodiments, the operation unit 10 calculates the reconstruction error RE by performing an optimization operation of calculating an optimal value on the basis of a predetermined function. That is, according to the embodiments, it is possible to easily perform anomaly detection with high robustness using a sparse coding method.

According to the aforementioned embodiments, the feature quantity acquiring unit 110A of the operation unit 10 acquires a plurality of feature quantities extracted from an input image PI. The dictionary information acquiring unit 120A acquires dictionary information corresponding to the plurality of feature quantities acquired by the feature quantity acquiring unit 110A. The reconstruction error calculating unit 130 calculates a reconstruction error RE of the input image PI by calculating a reconstruction error RE for each of the plurality of acquired feature quantities and summing the plurality of calculated reconstruction errors RE. That is, according to the embodiments, since the feature quantities extracted from a plurality of layers are used, sparse coding is performed on the feature quantities in different ranges. Accordingly, according to the embodiments, it is possible to perform anomaly detection with higher robustness.

In this embodiment, it is possible to perform anomaly detection with higher robustness by performing sparse coding on the feature quantities extracted from a plurality of layers, but there is a problem in that a time required for the processing is extended depending on the number of times of sparse coding. In other words, there is a tradeoff relationship between an accuracy and a processing time of anomaly detection. That is, when the number of feature quantities extracted by the feature quantity extracting unit 20 is large and sparse coding is performed on all the extracted feature quantities, there is a problem in that it takes much time.

According to the aforementioned embodiments, the operation unit 10B calculates the reconstruction errors RE for the selected number of feature quantities out of the plurality of feature quantities acquired by the feature quantity acquiring unit 110A using the selection unit 150 provided therein. That is, the reconstruction error calculating unit 130A calculates the reconstruction errors RE for the smaller number of feature quantities than the number of feature quantities acquired by the feature quantity acquiring unit 110A. Accordingly, according to the aforementioned embodiments, it is possible to perform anomaly detection with higher robustness for a short time.

The feature quantity extracting unit 20A may be configured to extract the number of feature quantities required by the operation unit 10B. According to the embodiments, the operation unit 10B includes the selection unit 150 and thus can resolve the tradeoff relationship between the accuracy and the processing time of anomaly detection when an existing learning model such as VGG16 or RESNET50 is used.

According to the aforementioned embodiments, the operation unit 10C additionally includes the determination unit 160 and thus determines whether the input image PI is a normal image on the basis of the reconstruction error RE. Accordingly, a user does not need to determine whether the input image PI is a normal image on the basis of the output reconstruction error RE and can easily ascertain whether the input image PI is a normal image.

Modified Example 1

For example, data which is input to the network described in the aforementioned embodiments is not limited to a single type, but may be a still image, a moving image, sound, characters, numerical values, and a combination thereof. The data which is input to the network may be a combination of measurement results from a physical quantity meter such as an optical sensor, a thermometer, a global positioning system (GPS) meter, an angular velocity meter, or a wind speed meter which can be mounted in an edge device provided with the network. The data may be a combination of different types of information such as base station information received from peripherals in a wired or wireless manner, information of a vehicle, a ship, or the like, weather information, surrounding information such as information on a congestion situation, finance information, private information, and the like.

Modified Example 2

Examples of the edge device provided with the network include a communication device such as a mobile phone which is driven by a battery or the like, a smart device such as a personal computer, and a mobile device such as a digital camera, a game machine, or a robot product, but the invention is not limited thereto. The edge device may be employed for a product with high demand for limitation of peak power, decrease of product heat generation, and long-time driving which can be supplied with power using power on Ethernet (PoE) which is an advantage which could not be obtained from other preceding examples. For example, long-time imaging can be realized by applying the invention to an onboard camera which is mounted in a vehicle, a ship, or the like or a monitoring camera which is provided in a public facility, on a road, or the like and contribution to a decrease in weight or an increase in durability can be achieved. The same advantages can be obtained by applying the invention to a display device such as a television or a display, a medical instrument such as a medical camera or a surgery robot, a working robot used in a production field or a construction site, or the like.

The programs according to the aforementioned embodiments may be realized by recording the programs on a computer-readable recording medium and causing a computer system to read the programs recorded on the recording medium and to execute the programs. The "computer system" mentioned herein includes an operating system (OS) and hardware such as peripherals. The "computer-readable recording medium" includes a portable medium such as a flexible disk, a magneto-optical disc, a ROM, or a CD-ROM and a storage device such as a hard disk incorporated in the computer system. The "computer-readable recording medium" may include a medium that dynamically holds a program for a short time such as a communication line when a program is transmitted via a network such as the Internet or a communication line such as a telephone line or a medium that holds a program for a predetermined time such as a volatile memory in a computer system serving as a server or a client in that case. The program may be for realizing some of the aforementioned functions or may be for realizing the aforementioned functions in combination with a program which is recorded in advance in a computer system.

The advantages described above in this specification are merely explanatory or exemplary, but are not restrictive. That is, the technique according to the present disclosure can achieve other advantages which are apparent to those skilled in the art from the above description in addition to the aforementioned advantages or instead of the aforementioned advantages. The invention is not limited to the embodiments and can be subjected to various modifications and substitutions without departing from the gist of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

5 Information processing device
10, 10A, 10B, 10C Operation unit
20 Feature quantity extracting unit
310 Dictionary information storage unit
110 Feature quantity acquiring unit
120 Dictionary information acquiring unit
130, 130A Reconstruction error calculating unit
131 Feature-quantity reconstruction error calculating unit
132 Sum calculating unit
140 Output unit
150 Selection unit
160 Determination unit
300 Storage unit
310 Dictionary information storage unit
320 ROM
330 RAM
410 Operation input unit
420 Display unit
PI Input image
RE Reconstruction error

What is claimed is:

1. A non-transitory computer-readable medium storing an operation program causing a computer to perform a process, the process comprising:
    a feature quantity acquiring step of acquiring a feature quantity which is extracted from an input image;
    a reconstruction error calculating step of calculating a reconstruction error on the basis of a difference between the acquired feature quantity and an average which is determined in advance on the basis of a normal image;
    an output step of outputting a result of calculation in the reconstruction error calculating step; and
    a dictionary information acquiring step of acquiring a difference from the average which is determined in advance on the basis of the normal image as dictionary information including a plurality of elements of which each is a pattern of a plurality of features constituting the feature quantity extracted from the normal image;
    wherein the reconstruction error calculating step includes calculating the reconstruction error by reconstructing the acquired feature quantity on the basis of the acquired dictionary information.

2. The non-transitory computer-readable medium storing the operation program according to claim 1, wherein the reconstruction error calculating step includes calculating the reconstruction error by performing an optimization operation of calculating an optimal value on the basis of a predetermined function.

3. The non-transitory computer-readable medium storing the operation program according to claim 2, wherein the feature quantity acquiring step includes acquiring a plurality of feature quantities extracted from the input image,
    wherein the reconstruction error calculating step includes calculating the reconstruction error for each of the plurality of acquired feature quantities and calculating the reconstruction error of the input image by performing an operation based on the calculated reconstruction errors, and
    wherein the output step includes conclusively outputting the calculated reconstruction error of the input image.

4. The non-transitory computer-readable medium storing the operation program according to claim 2, wherein the feature quantity acquiring step includes acquiring a plurality of feature quantities extracted from the input image,
    wherein the reconstruction error calculating step includes calculating the reconstruction error for each of the plurality of acquired feature quantities and calculating the reconstruction error of the input image by performing an operation based on the calculated reconstruction errors, and
    wherein the output step includes conclusively outputting the calculated reconstruction error of the input image.

5. The non-transitory computer-readable medium storing the operation program according to claim 4, wherein the reconstruction error calculating step includes calculating the reconstruction error using a smaller number of feature quantities than the number of feature quantities acquired in the feature quantity acquiring step.

6. The non-transitory computer-readable medium storing the operation program according to claim 4, wherein the reconstruction error calculating step includes calculating the reconstruction error using a smaller number of feature quantities than the number of feature quantities acquired in the feature quantity acquiring step.

7. The non-transitory computer-readable medium storing the operation program according to claim 1, causing the computer to further perform a determination step of determining whether the input image is a normal image on the basis of a predetermined threshold value and the reconstruction error calculated in the reconstruction error calculating step.

8. The non-transitory computer-readable medium storing the operation program according to claim 1, wherein the feature quantity acquiring step includes acquiring the feature quantity from a plurality of intermediate layers of a convolutional neural network with the input image as an input.

9. The non-transitory computer-readable medium storing the operation program according to claim 8, wherein the convolutional neural network is additionally provided in the operation program.

10. An operation method comprising:
- a feature quantity acquiring process of acquiring a feature quantity which is extracted from an input image;
- a reconstruction error calculating process of calculating a reconstruction error on the basis of a difference between the acquired feature quantity and an average which is determined in advance on the basis of a normal image; and
- an output process of outputting a result of calculation in the reconstruction error calculating process;
- a dictionary information acquiring process of acquiring a difference from the average which is determined in advance on the basis of the normal image as dictionary information including a plurality of elements of which each is a pattern of a plurality of features constituting the feature quantity extracted from the normal image;
- wherein the reconstruction error calculating process includes calculating the reconstruction error by reconstructing the acquired feature quantity on the basis of the acquired dictionary information.

11. An operation device comprising:
- a memory configured to store dictionary information including a plurality of elements of which each is a pattern of a plurality of features constituting a feature quantity extracted from an image; and
- a operation circuitry configured to:
  - acquire the feature quantity which is extracted from an input image;
  - acquire the dictionary information from the memory;
    - calculate a reconstruction error on the basis of a difference between the acquired feature quantity and an average which is determined in advance on the basis of a normal image, referring to the acquired dictionary information from the memory;
    - output a result a calculation of the reconstruction error; and
  - acquire a difference from the average which is determined in advance on the basis of the normal image as dictionary information including a plurality of elements of which each is a pattern of a plurality of features constituting the feature quantity extracted from the normal image;
- wherein calculating the reconstruction error includes by reconstructing the acquired feature quantity on the basis of the acquired dictionary information.

* * * * *